A. A. PAGE & H. G. COLLINS.
LOCK.
APPLICATION FILED SEPT. 27, 1911.

1,229,318.

Patented June 12, 1917.
6 SHEETS—SHEET 1.

WITNESSES:
F. A. Carlson
H. P. Doolittle

INVENTORS,
Albert A. Page and
Herbert G. Collins
BY
Beach, Fish
ATTORNEYS.

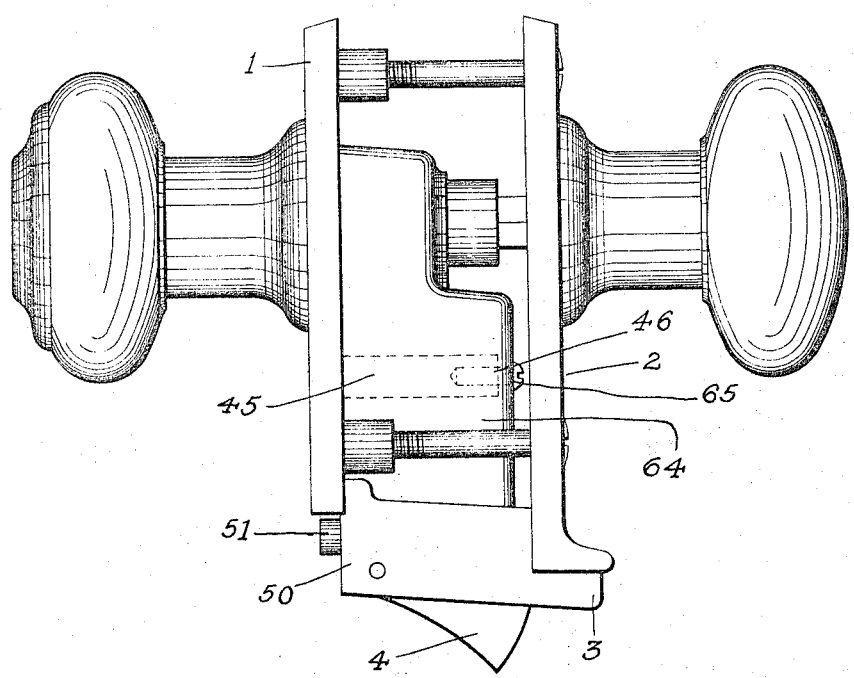
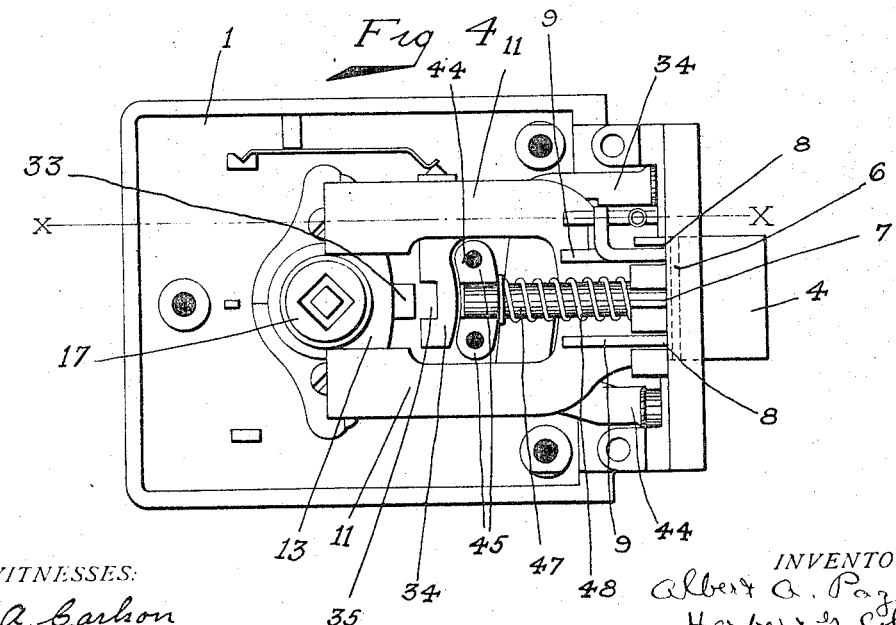

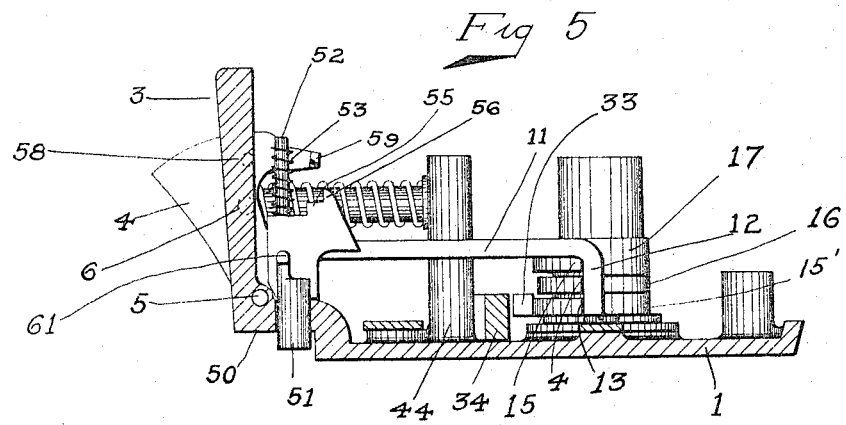
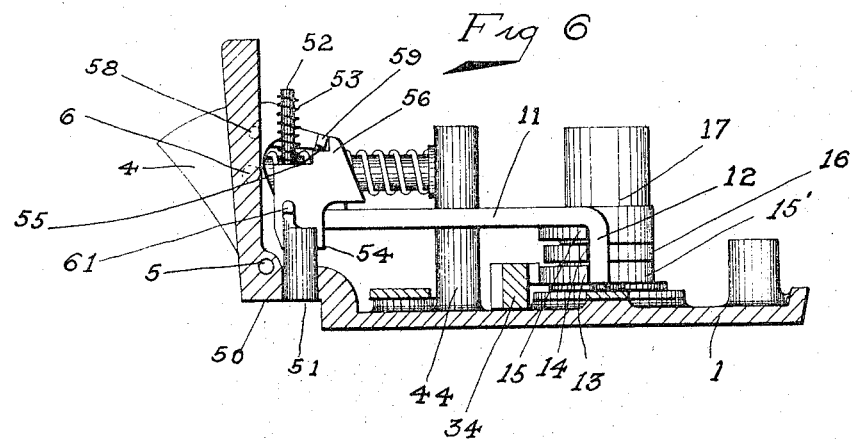
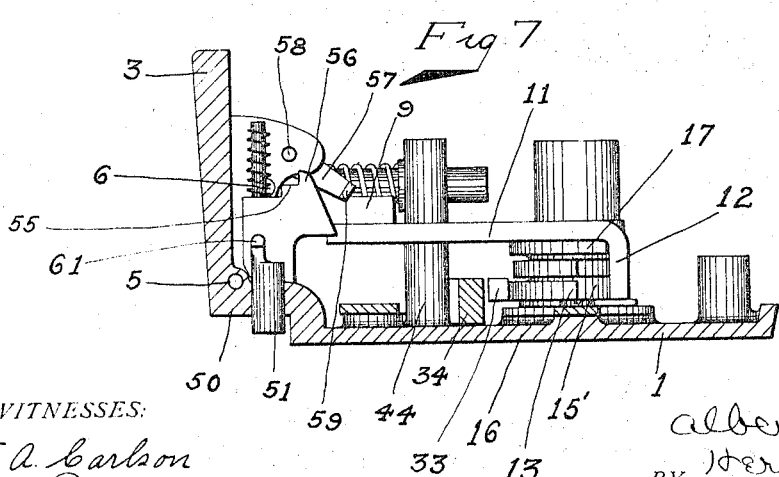

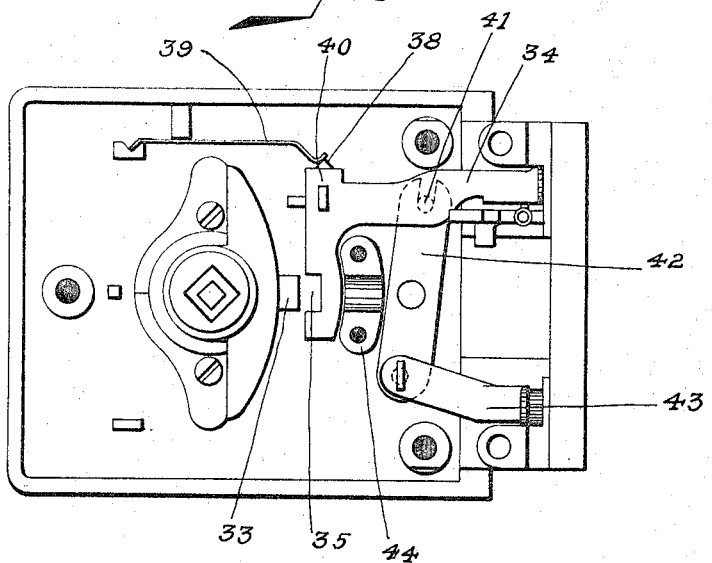

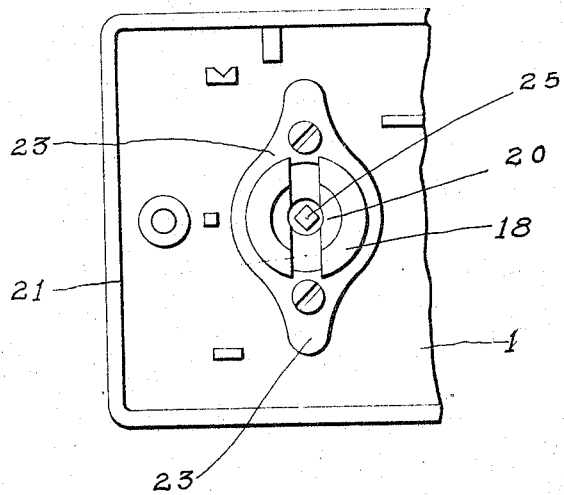
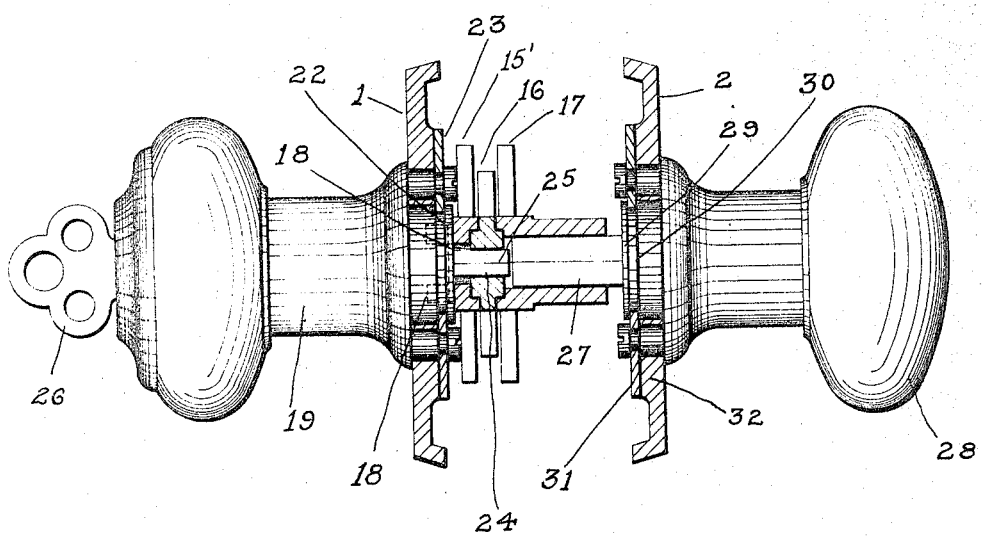

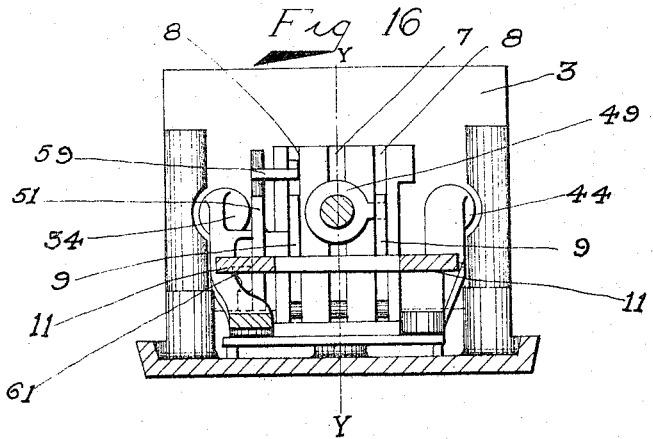
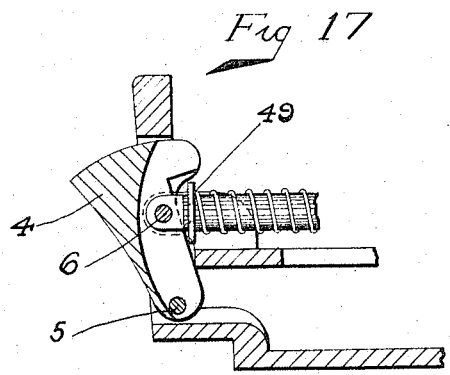
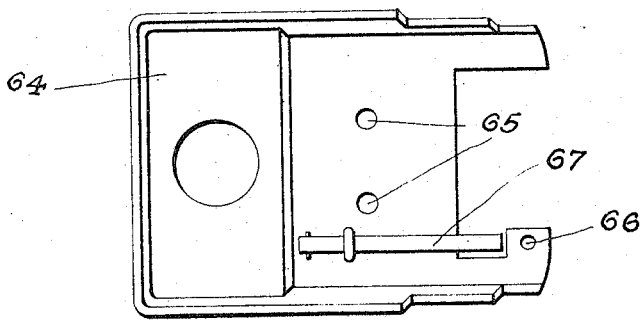

UNITED STATES PATENT OFFICE.

ALBERT A. PAGE, OF EAST HAVEN, AND HERBERT G. COLLINS, OF NEW HAVEN, CONNECTICUT, ASSIGNORS TO SARGENT & COMPANY, OF NEW HAVEN, CONNECTICUT, A CORPORATION OF CONNECTICUT.

LOCK.

1,229,318.   Specification of Letters Patent.   Patented June 12, 1917.

Application filed September 27, 1911. Serial No. 651,597.

*To all whom it may concern:*

Be it known that we, ALBERT A. PAGE, of the town of East Haven, county of New Haven, and State of Connecticut, and HERBERT G. COLLINS, of the city of New Haven, in said county and State, have invented new and useful Improvements in Locks, of which the following is a full, clear, and exact description, when taken in connection with the accompanying drawings, which form a part thereof.

Our invention relates to locks and it more particularly relates to the class of escutcheon locks, and its objects are to improve the means of mounting and securing the operative parts of the lock whereby greater facility of assemblage of such parts is afforded, and to generally simplify and improve the construction of the lock.

To these ends, our invention is embodied in preferable form in the device hereinafter described and illustrated in the accompanying drawings.

Figure 1:
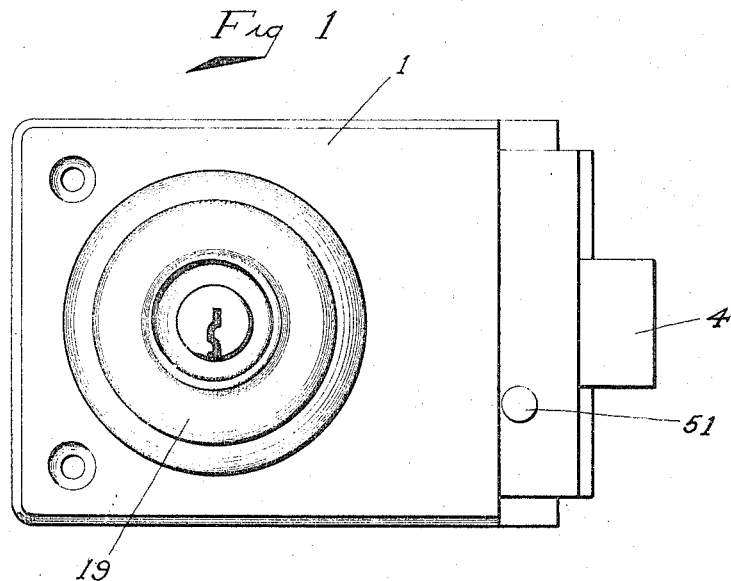
Figure 2:
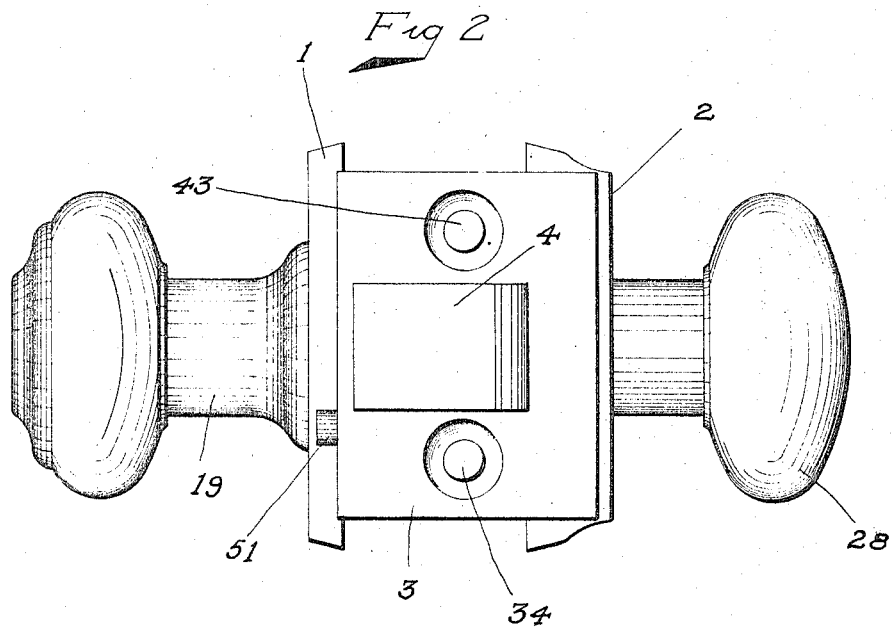

In these drawings,

Figure 1 is a side view in elevation of the lock looking toward the outer face of the outside escutcheon;

Fig. 2, a front view in elevation;

Fig. 3, a top plan view;

Fig. 4, a side view in elevation of the inner face of the outer escutcheon, the inner escutcheon, and the cover for the operating parts being removed, and with the latch bolt protracted and the door open;

Fig. 5, a longitudinal section on the line $x$—$x$ of Fig. 4;

Fig. 6, a view similar to Fig. 5, showing the night latch mechanism in position;

Fig. 7, a view similar to Fig. 5, showing the latch bolt retracted;

Fig. 8, a detail top plan view of the latch bolt dogging member;

Fig. 9, a rear edge view of said dogging member;

Fig. 10, a front edge view of said dogging member;

Fig. 11, a detail top plan view partly in section of the yoke and stop means connected therewith for coöperating with the dogging member;

Fig. 12, a detail bottom plan view of the deadlocking slide of the night latch mechanism;

Fig. 13, a view similar to Fig. 4, with the latch bolt and its yoke removed;

Fig. 14, a similar view broken away with the operating hubs removed and showing the inner end of the outer knob spindle; and Fig. 15, a cross section of the lock with the hubs in place;

Fig. 16, a side view in elevation of the inner side of the face plate;

Fig. 17, a section on the line $y$—$y$ of Fig. 16;

Fig. 18, an inside view of the removable cover.

In all figures, similar letters of reference represent like parts.

Referring to the drawings, 1 is the outer escutcheon and 2 the inner escutcheon. Formed integral with the outer escutcheon plate and extending at an angle thereto is a face plate 3 provided with an opening through which projects a latch bolt 4 pivotally mounted on a pin 5 extending across and through the face plate.

This pivoted latch bolt within its center line has a pivot pin 6 which extends through a central slot 7 and side slots 8, formed in the inner part of the latch bolt. Extending into the side slots 8 are inwardly inclined arms 9 having elongated slots 10 engaging said pin 6. (See Fig. 11.) These arms are integral with a forked yoke 11, the branches of which have outwardly projecting arms 12. These arms are adapted to take over and engage the wings 13, 14, and 15 of operating hubs 15', 16 and 17, which are concentrically mounted.

The outermost hub 15' is operable by the shank 18 of the outside knob 19. This shank at its inner end is provided with a head having a recess 20 adapted to seat a projecting boss of the hub 15', which boss is provided with two diametrically opposite lugs which engage a transverse slot 21 formed in the shank, whereby the hub may be turned with the shank. The shank head has an outer circumferential slot 22 into which projects the edge portion of a two-part plate 23, surrounding the shank opening and fixed to the inner face of the escutcheon 1, whereby the knob and its shank are held rigidly against longitudinal withdrawal, while at the same time free rotation thereof is permitted.

The intermediate hub 16 has a small angular opening 24 adapted to receive the angular stem 25 connected to one of the operating members of a pin tumbler lock mounted within the outer knob and controlled by a key 26, insertible through the face of the outer knob.

The inner hub member 17 is provided with an elongated sleeve and has a squared or otherwise angularly formed opening in its inner end with which is adapted to engage the similarly formed spindle 27 of an inside knob 28. The shank 29 of the knob is provided near its inner end with a circumferential slot or groove 30, into which projects the edge of a two-part plate 31 which is rigidly secured upon the ledge 32 on the inner face of the escutcheon 2.

The outside hub 15' is provided with a laterally projecting lug 33, which is adapted to be engaged by a movable member of a suitable night latch mechanism for the purpose of deadlocking the outside knob. To this end, a manually operable deadlocking slide 34 is mounted on the inner face of the outside escutcheon 1, and is provided at its inner end with a slot 35 adapted when the slide is pushed inwardly to engage said lug 33 so as to hold the hub 15' against rotation. The slide has a forward inclined arm 36 which is provided with a thumb stop member 37 projecting through the face plate. A beveled tooth 38 projecting laterally from the slide is adapted to engage the bent end of a spring 39 which serves to yieldingly hold the slide in the position to which it may be adjusted. (Fig. 13.) A guide lug 40 projects inwardly from the slide and serves to limit the outward movement of the yoke and guide the latter in a straight reciprocal movement.

The slide has a pin 41 projecting toward the escutcheon and engaging a notch in the end of a walking beam 42 which is centrally pivoted and serves to operatively connect said deadlocking slide with a releasing thumb-stop slide 43 projecting through the face plate. When the thumb stop 43 is pressed inwardly such movement withdraws the slide 34 from deadlocking position.

Between the arms of the latch bolt yoke a standard 44 projects from the inner face of the escutcheon 1. The standard 44 has interiorly threaded posts 45 adapted to receive the ends of screws 46, passing through the cover hereinafter described. Between these posts a bearing is provided for a reciprocating latch bolt stem or rod 47 pivoted at its outer end to the latch bolt and surrounded by a spiral spring 48 held between the standard and a collar 49 loosely secured to one of the arms 9. (See Fig. 16.) This spring serves to normally hold the latch bolt protracted. The latch bolt rod 47 on which the spring is mounted is pivoted to the latch bolt pin 6 within the middle slot 7, as shown in Fig. 17.

Projecting through a flange 50 joining the face plate and the escutcheon 1 is an automatic dogging member 51, which has a sliding movement in said flange approximately parallel to the face plate, and the outer end of which is adapted to contact with the striker plate or jamb when the door is closed for the purpose of sliding the member inwardly into dogging position. This member is adapted not only to dog the latch bolt, but also the night latch mechanism, and serves to prevent the retraction of either of said mechanisms by an instrument inserted between the door and the jamb. This member 51 has a stem 52 surrounded by a spiral spring 53 which serves to keep the outer end of the member normally protracted when the door is open. A shoulder 54 limits the outward movement of the member 51.

A ledge 55 projecting inwardly from the member 51 and a shoulder 56 on said member are adapted to coöperate with a latch bolt stop member 57 pivoted at 58 to the latch bolt in one of the slots 8 and provided with a lug 59, which the shoulder 56 is adapted to engage for the purpose of preventing the retraction of the latch bolt.

The pivoted stop member or dog 57 is provided with a rounded cam-shaped tail piece 60 (Fig. 11) which bears against the outer face of one of the arms 9. As the yoke is reciprocated this arm 9, by its movement relative to the latch bolt head, owing to its elongated slot, is adapted to move against the cam 60 and tilt the stop member 57 on its pivot so as to move the lug 59 into or out of position to engage the shoulder 56 of the dogging member 51 when the latter is in its inner dogging position.

The said dogging member is adapted also to dog the night latch mechanism when the latter is in dogging position and to this end, it has a lug 61 which, when the deadlocking slide 34 is in retracted position, is moved into a recess and in front of a shoulder 62 of said slide by the incursion of the dogging member upon the closing of the door.

The dogging member is provided with a lug 63 which serves as a guide for the sliding yoke connection to the latch bolt.

Adapted to inclose the operative parts of the lock and to retain them in place is a cover 64 having an aperture for the inside knob shank, and apertures 65 corresponding to the screw holes in the posts of the supporting standard 44 projecting from the escutcheon.

This cover is also provided with an aperture 66 to receive the end of the stem of the dogging member 51. The spring surrounding said stem bears against the inner face of the cover.

Secured to the inner face of the cover is a flat spring 67 adapted to bear against the lug 59 of the stop member 57 so as to tend to carry said member into line with the shoulder 56 of the dogging member.

The cover 64 is entirely free of one (the inside) escutcheon and it is spaced from said escutcheon as shown in Fig. 3. The cover is of box-like form having opposite side walls and an end wall with edges in abutment with the inner surface of the other (the outside) escutcheon. At the other end the cover is cut away so that the end edges of its side walls and the end edge of its back wall may be substantially in contact with the inner surface of the face plate. The standard and the screws or their equivalents associated therewith, form the sole means for detachably securing the cover in place, and the latter may therefore be very readily assembled in the lock structure. The several screws for adjustably connecting the escutcheons are preferably located outside of the cover and the latter may be rigidly carried by the outside escutcheon when the inside escutcheon is entirely removed.

The rod 47 on which the spring 48 is mounted is simply set at its inner end in the notch in the standard 44 which lies between the cover securing posts or lugs 45. In this manner the spring action is imparted to the bolt in a simple and effective manner without the necessity of a special spring or springs acting directly on the yoke.

The dogging member 51 is very effectively guided in its rectilinear movement, inasmuch as it has a bearing at one end in one escutcheon and at the opposite end in the perforation 66 of the cover.

The portion of the cover which is adjacent the axis of the knobs holds the several hubs securely in place, the latter being confined between the back or inner wall of the cover and the inside face of the outer escutcheon without the interposition of any special retaining member. In other words, the inner or back wall of the cover, in forming a bearing for the hub of the inside knob, and holding said hub in coöperation with the other hubs, secures the hubs effectively in place without the necessity of providing another hub retaining wall on the cover to coöperate directly with the hub of the outside knob.

It will be seen that all the operative parts of the lock are mounted upon the inner face of the integral outside escutcheon, and the parts may be readily and quickly assembled by first placing the latch bolt and yoke in position, then inserting the dogging member into its socket, and then placing in position the deadlocking night latch members.

Each knob shank is held rigidly to its respective escutcheon and can only be withdrawn by removing said escutcheon, and then unscrewing the shank therefrom.

After the latch bolt mechanism has been mounted on the outside escutcheon, the cover is put in place and screwed on and then the inner escutcheon attached.

Assuming that the night latch mechanism is "off" when the door is closed, the projecting end of the dogging member 51 will strike against the striker plate or jamb and the shoulder 56 of the dogging member will be carried behind the lug 59 of the stop member 57 pivoted to the latch bolt, thus preventing the retraction of said latch bolt by an instrument inserted between the face plate and the jamb. In such position, however, the latch bolt may still be retracted by the yoke through actuation thereof by the inner or outer knob or the lock in the knob, each of which actuating parts is operatively engaged with its respective winged hub.

When any of the hubs is turned, the yoke will be retracted and the arms 9 rigidly connected thereto will have a slight inward movement relative to the latch bolt by reason of the elongated slots 10 so that the upper arm 9 will also move relatively to the stop member 57 and thus carry the flat inner face of the arm against the tail piece cam 60, thus tilting the stop member or dog 57 and carrying the lug inwardly away from the dogging member, permitting the latch bolt to be retracted.

When the night latch mechanism has been set prior to closing the door, by pressing inwardly thumb stop slide 34 to engage its slot 35, with the lug 33 of the outside hub, the dogging member is carried inwardly to the same position as before described as the door is closed, and thereupon in addition to dogging the latch bolt, the lug 61 is projected inwardly in front of the shoulder 62 so as to prevent the deadlocking slide 34 from being pushed outwardly by pressure on the slide 43.

Having thus described our invention, what we claim, is:—

1. In a lock, the combination of inside and outside escutcheons or side plates, a face plate carried by the outside escutcheon, a pivoted latch bolt projecting through said face plate, a standard projecting inward from the inner face of the outside escutcheon and having a notch therein at its free end, a spindle pivoted to the latch bolt and engaging the notch in said standard so as to be guided thereby, a spring interposed between said standard and the latch bolt head for projecting said bolt, a yoke connected with the bolt, hubs for operating said bolt by means of said yoke mounted adjacent the outside escutcheon, a cover plate for holding said latch retracting parts in their proper operative positions having a wall supported against said standard and overlying the yoke and hubs, means for detachably securing said cover plate to the outside escutcheon and against said standard, and knobs on the respective escutcheons for operating the respective hubs; substantially as described.

2. In a lock, the combination of inside and outside escutcheons or side plates, a face plate carried by the outside escutcheon, a pivoted latch bolt projecting through said face plate, a standard projecting inward from the inner face of the outside escutcheon and having a notch therein, a spindle pivoted to the latch bolt and engaging the notch of said standard so as to be guided thereby, a spring interposed between said standard and the bolt head, a yoke connected with the latch bolt, inner and outer hubs for operating said latch bolt by means of said yoke, knobs on the respective escutcheons for operating said hubs, an intermediate hub for operating said yoke, a lock in the outside knob operatively connected with said intermediate hub, a cover plate for holding the latch retracting parts in their proper operative positions, and means for attaching said cover plate to the outside escutcheon so that it abuts the free end of said standard; substantially as described.

3. In a lock, the combination of inside and outside escutcheons, a face plate carried by one of said escutcheons, a pivoted latch bolt projecting through said face plate, a standard projecting from the inner face of one of said escutcheons, a spindle connected with the latch bolt and guided in said standard, a spring interposed between said standard and the bolt head, a yoke connected with the latch bolt, inside and outside hubs for operating said latch bolt by means of said yoke associated with one of said escutcheons, knobs on the respective escutcheons for operating the respective hubs, a third hub associated with the first two hubs and likewise adapted to operate said yoke, a lock in the outside knob operatively connected with said third hub, a cover plate for holding the latch retracting parts in proper operative positions between it and the escutcheon having the standard, and means for detachably securing said cover plate to said escutcheon and holding it in contact with said standard; substantially as described.

4. In a lock, the combination of inside and outside escutcheons, a face plate carried by one of said escutcheons, a pivoted latch bolt projecting through said face plate, a standard projecting from the inner face of one of said escutcheons, and having a notch in its free end, a spindle pivoted to the latch bolt, and guided in said notch, a spring embracing the spindle and interposed between said standard and the bolt head, a yoke connected with the latch bolt, inside and outside hubs for operating said latch bolt by means of said yoke, knobs on the respective escutcheons connected with the respective hubs, a third intermediate hub, a lock in the outside knob, means of connection between said lock and said intermediate hub, and a closure for supporting the several latch retracting parts on the escutcheon having said standard and including a plate detachably clamped against said standard; substantially as described.

5. In a lock, the combination of inside and outside escutcheons, a face plate carried by the outside escutcheon, a pivoted latch bolt projecting through said face plate, a standard projecting inward from the inner face of the outside escutcheon and having a notch at its free end, a spindle pivoted to the latch bolt and engaging said notch so as to be guided thereby, a spring embracing said spindle and interposed between said standard and the bolt head, a yoke connected with the latch bolt, inside and outside hubs for operating said bolt by means of said yoke, associated with the outside escutcheon at the rear of said standard, said yoke straddling said standard, and a cover plate for holding the latch retracting parts in their proper operative relation detachably secured to the outside escutcheon and overlying the free end of said standard to hold the latch bolt spindle in position therein; substantially as described.

6. In a lock, the combination with an inner escutcheon and an outer escutcheon; of a detachable cover member mounted between said escutcheons, said lock having its operative parts carried by said outer escutcheon between the same and the cover plate, substantially as described.

7. In a lock, the combination with an inner escutcheon and an outer escutcheon, said lock having its operative parts mounted in and carried by the inner face of said outer escutcheon, a cover plate having a wall projecting toward the face of the escutcheon and inclosing said parts, substantially as described.

8. In a lock, the combination of inner and outer escutcheons, a face plate carried by the outer escutcheon, a latch bolt projecting through the face plate, a cover having a back or inner wall spaced from the inner escutcheon, and having walls projecting forward toward and into substantial abutment with the outer escutcheon, latch bolt retracting hubs confined between the inner or back wall of said cover and the inner face of the outer escutcheon, and knobs carried by the respective escutcheons to actuate said hubs; substantially as described.

9. In a lock, the combination of inner and outer escutcheons, a face plate carried by the outer escutcheon, a latch bolt projecting through said face plate, a cover plate secured to the outer escutcheon and having an inner or back wall spaced from both escutcheons, said cover having walls projecting toward the outer escutcheon with free edges in substantial abutment therewith, means for securing said cover plate to the outer escutcheon, latch bolt retracting hubs confined between the back wall of said cover and the inner face of the outer escutcheon, knobs carried by the respective escutcheons to coöperate with said hubs; substantially as described.

10. In a lock, the combination of inner and outer escutcheons, a face plate on the outer escutcheon, a latch bolt projecting through the face plate, a one-piece cover having a back wall spaced from both escutcheons and attached to the outer escutcheon, said cover having walls projecting toward and into substantial abutment with the outer escutcheon and cut away at one end to present edges in substantial abutment with the face plate, hubs for retracting the latch bolt, confined between the cover and the outer escutcheon, and knobs carried by the escutcheons to coöperate with said hubs; substantially as described.

11. In a lock, the combination of inner and outer escutcheons, a face plate carried by the outer escutcheon, a latch bolt projecting through the face plate, a cover having an inner or back wall spaced from both escutcheons, said cover having walls projecting toward the outer escutcheon and toward the face plate and provided with free edges in substantial abutment with the outer escutcheon and face plate, the cover being closed at the end opposite the face plate, means for securing said cover to said outer escutcheon, latch bolt retracting hubs within the cover, and knobs having spindles projecting through the escutcheons into coöperation with the hubs; substantially as described.

12. In a lock, the combination of separate side plates or escutcheons, a face plate carried by one escutcheon, a latch bolt projecting through the face plate, a one-piece cover plate having a back or inner wall spaced from both escutcheons and walls projecting from said back or inner wall toward and into substantial abutment with the first escutcheon, means supporting said cover plate on said first escutcheon, hubs housed between the inner or back wall of the cover plate and the first escutcheon and freely removable when the cover plate is detached, a yoke connecting said hubs with said latch bolt, and knobs carried by the respective escutcheons and operatively connected with the respective hubs; substantially as described.

13. In a lock, the combination of separate escutcheons, a face plate carried by one escutcheon, a latch bolt projecting through said face plate, a cover having an inner or back wall spaced from both escutcheons, and walls projecting from said inner or back wall toward and into substantial abutment with the first escutcheon, said last named walls having free edges in substantial abutment with the first escutcheon, said cover being open at the end adjacent the face plate but closed at the opposite end, means for detachably securing said cover to said first named escutcheon, latch bolt retracting hubs housed between the inner face of the first escutcheon and the back wall of the cover, and knobs carried by the respective escutcheons and operatively connected with said hubs; substantially as described.

14. In a unit lock, the combination of separate escutcheons, a face plate carried by one escutcheon, a latch bolt projecting through the face plate, a standard projecting inward from said escutcheon, a cover having an inner or back wall supported on said standard, hubs housed between the inner face of the first escutcheon and the back wall of said cover, and knobs carried by the respective escutcheons and operatively connected with said hubs; substantially as described.

15. In a unit lock, the combination of separate escutcheons, a face plate carried by one escutcheon, a latch bolt projecting through said face plate, a standard projecting inward from said first escutcheon, a cover having a back or inner wall detachably secured to said standard, and walls projecting from said back wall toward the first escutcheon, hubs between the first escutcheon and the back wall of the cover, and knobs for operating said hubs; substantially as described.

16. In a unit lock, the combination of separate escutcheons, a face plate on one escutcheon, a latch bolt projecting through said face plate, a standard projecting inward from said first escutcheon, a cover having a back or inner wall supported by said standard, and walls projecting from said back or inner wall toward the first escutcheon, means for detachably securing the back wall of said cover to said standard, and retracting mechanism for the latch bolt housed between the first escutcheon and the back wall of the cover; substantially as described.

17. In a lock, the combination with the side plates or escutcheons, the face plate carried by one of said side plates or escutcheons, and the latch bolt projecting through said face plate, of a standard projecting from the inner face of one escutcheon and having a notch at the free end thereof, a spring-pressed spindle guided in the notch of said standard and pivoted to the bolt, a yoke pivoted to the bolt, hubs and knobs for operating the bolt by means of said yoke, and a cover plate supported on the inner or free end of said standard and holding said spindle in the notch of the standard; substantially as described.

18. In a lock, the combination of a pivoted bolt having a slot, a pin in said slot, a yoke having a slot engaging said pin, a second pin in said first slot, a stop member or dog pivoted to said second pin and engaged with said yoke to tilt or swing said stop member or dog, and a member to engage said stop member or dog automatically when the door is closed; substantially as described.

19. In a lock, the combination of a pair of escutcheons, a latch bolt, a standard projecting inwardly from one of said escutcheons and guiding said latch bolt, and a cover having an inner or back wall detachably secured to said standard, and provided with side walls projecting toward and in substantial abutment with the inner face of the last named escutcheon; substantially as described.

20. In a lock, the combination of an escutcheon, a face plate, a pivoted latch bolt projecting through the face plate, a standard or post projecting inwardly from said escutcheon and having a notch, a spring-pressed stem pivoted to said bolt and guided in said notch, a yoke having members pivoted to the bolt on opposite sides of said stem, means for actuating the yoke, and a cover plate secured to said standard or post, and holding said stem in said notch; substantially as described.

21. In a lock, the combination of inside and outside escutcheons, a face plate carried by one of said escutcheons, a pivoted latch bolt projecting through said face plate, a standard projecting from the inner face of one of said escutcheons, a spindle connected with the latch bolt and guided in said standard, a yoke connected with the latch bolt, hubs for operating said latch bolt by means of said yoke, associated with the escutcheon having the standard, a cover plate for holding said latch-retracting parts in their proper operative positions, comprising a back or inner wall supported by said standard and overlying the yoke and hubs, said cover plate also having walls projecting substantially into contact with the escutcheon carrying the standard, means for securing said cover plate to said escutcheon, and against said standard, and knobs on the respective escutcheons for operating the respective hubs; substantially as described.

In witness whereof, we have hereunto set our hands on the 25th day of September, 1911.

ALBERT A. PAGE.
HERBERT G. COLLINS.

Witnesses:
HENRY H. MUNSON,
CARL W. CARLSEN.